United States Patent
Tiell (10) Patent No.: US 9,928,290 B2
(45) Date of Patent: Mar. 27, 2018

(54) TRUST FRAMEWORK FOR PLATFORM DATA

(71) Applicant: Accenture Global Solutions Limited, Dublin (IE)

(72) Inventor: Steven C. Tiell, San Francisco, CA (US)

(73) Assignee: Accenture Global Solutions Limited, Dublin (IE)

( * ) Notice: Subject to any disclaimer, the term of this patent is extended or adjusted under 35 U.S.C. 154(b) by 225 days.

(21) Appl. No.: 15/095,481

(22) Filed: Apr. 11, 2016

(65) Prior Publication Data

US 2017/0054611 A1   Feb. 23, 2017

Related U.S. Application Data

(60) Provisional application No. 62/206,078, filed on Aug. 17, 2015.

(51) Int. Cl.
| | |
|---|---|
| *G06F 15/16* | (2006.01) |
| *G06F 17/30* | (2006.01) |
| *G06Q 30/06* | (2012.01) |
| *G06Q 30/02* | (2012.01) |
| *G06F 21/62* | (2013.01) |

(Continued)

(52) U.S. Cl.
CPC .. *G06F 17/30598* (2013.01); *G06F 17/30073* (2013.01); *G06F 17/30117* (2013.01); *G06F 17/30241* (2013.01); *G06F 17/30312* (2013.01); *G06F 17/30528* (2013.01); *G06F 17/30867* (2013.01); *G06F 21/6227* (2013.01); *G06F 21/6236* (2013.01); *G06Q 30/0201* (2013.01); *G06Q 30/0601* (2013.01); *G06Q 30/0631* (2013.01); *H04L 43/04* (2013.01); *H04L 43/0876* (2013.01); *H04L 67/22* (2013.01)

(58) Field of Classification Search
CPC ............................. H04L 67/22; G06Q 30/0201
See application file for complete search history.

(56) References Cited

U.S. PATENT DOCUMENTS

| | | | |
|---|---|---|---|
| 8,413,251 B1 * | 4/2013 | Gibney | G06Q 10/107 709/224 |
| 2007/0103984 A1 | 5/2007 | Kavuri et al. | |
| 2009/0228397 A1 | 9/2009 | Tawakol et al. | |

(Continued)

FOREIGN PATENT DOCUMENTS

WO    WO2016063092    *   4/2014

*Primary Examiner* — Bryan Lee
(74) *Attorney, Agent, or Firm* — Fish & Richardson P.C.

(57) ABSTRACT

Techniques are described for determining and employing trust metrics for entities interacting with a super-platform. An end-user may interact with multiple individual platforms of different types. The individual platforms may generate data based on the interactions with end-user(s). The data from the various individual platforms may be received, ingested, stored, analyzed, aggregated, and/or otherwise processed by a super-platform. The super-platform may provide the data, aggregate data, and/or data analysis results to data consumer(s) through a marketplace associated with the super-platform. In some implementations, entities such as data providers, data manipulators, and/or data consumers may rate one another and, based on the rating(s), a trust metric may be determined that indicates a trust level of an entity.

13 Claims, 5 Drawing Sheets

(51) Int. Cl.
*H04L 12/26* (2006.01)
*H04L 29/08* (2006.01)

(56) References Cited

U.S. PATENT DOCUMENTS

| | | |
|---|---|---|
| 2012/0054680 A1 | 3/2012 | Moonka et al. |
| 2012/0197856 A1 | 8/2012 | Banka et al. |
| 2012/0303736 A1 | 11/2012 | Novotny et al. |
| 2014/0180826 A1 | 6/2014 | Boal |
| 2014/0244399 A1* | 8/2014 | Orduna ............. G06F 17/30696 705/14.66 |
| 2014/0344015 A1* | 11/2014 | Puertolas-Montanes ............. G06Q 20/10 705/7.29 |
| 2017/0046806 A1 | 2/2017 | Haldenby et al. |
| 2017/0053131 A1 | 2/2017 | Modi et al. |
| 2017/0053295 A1 | 2/2017 | Tiell et al. |
| 2017/0054611 A1 | 2/2017 | Tiell et al. |

* cited by examiner

TRUST FRAMEWORK FOR PLATFORM DATA

CROSS-REFERENCE TO RELATED APPLICATION

This application claims priority to U.S. Provisional Patent Application Ser. No. 62/206,078 filed on Aug. 17, 2015, titled "Super-Platform," which is hereby incorporated by reference in the entirety.

BACKGROUND

With the rapid growth of ubiquitous computing and the Internet of Things (IoT), users are interacting with many different computing systems in the course of their lives. In addition to interacting with devices that have a primary function of computing, such as home computers, mobile computing devices, server computers, and so forth, users may also interact with devices that include computers as components, such as smart appliances, automotive computers, or any number of IoT devices. The various computing devices may generate data regarding users, and such data may be generated and delivered using different formats, models, or communications channels.

SUMMARY

Implementations of the present disclosure are generally directed to a trust framework for a super-platform. More specifically, implementations are directed to receiving rating(s) of entities associated with the super-platform, such as data providers, data manipulators, and/or data consumers, and determining a trust metric for an entity based at least partly on the rating(s).

In general, innovative aspects of the subject matter described in this specification can be embodied in methods that includes actions of: storing, on one or more storage devices associated with a super-platform, data generated at a plurality of individual platforms, the data associated with at least one end-user of the plurality of individual platforms; determining data tracking information including one or more events associated with the data, the one or more events including a distribution of the data to a data consumer; based at least partly on the data tracking information, determining a data consumer trust metric that indicates a level of trust in the data consumer; and presenting the data consumer trust metric to the at least one end-user.

Implementations can optionally include one or more of the following features: the data tracking information includes a blockchain associated with the data; the actions further include determining a data provider trust metric that indicates a level of trust in at least one of an end-user or an individual platform that generated the data, the data provider trust metric based at least partly on at least one trust rating provided by at least one data consumer; the actions further include incorporating the data provider trust metric into the data tracking information associated with the data; the actions further include aggregating the data from multiple individual platforms to generate aggregate data; the actions further include determining aggregate data tracking information including one or more events associated with the aggregate data; the data tracking information includes an event that indicates the aggregating of the data and that includes a pointer to the aggregate data tracking information associated with the aggregate data; the actions further include determining an aggregate trust metric for the aggregate data based at least partly on individual trust metrics for portions of the data that are aggregated to generate the aggregate data; the actions further include incorporating the aggregate trust metric into the aggregate data tracking information associated with the aggregate data; the actions further include receiving one or more restrictions on use of the data, the one or more restrictions provided by the at least one end-user; the actions further include monitoring the use of the data to determine a degree of compliance, by the data consumer, with the one or more restrictions; the actions further include updating the data consumer trust metric based on the determined degree of compliance; the data consumer trust metric is further based at least partly on at least one trust rating provided by the at least one end-user; and/or the plurality of individual platforms include at least two of an e-commerce platform configured to provide an e-commerce service, a retail platform configured to support retail operations of a physical store, a media platform configured to provide an online media service, a mobile computing device, an Internet of Things (IoT) computing device, or an in-vehicle computer.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations provide at least the following advantages. By providing end-users with trust metrics that indicate a level of trust in data consumers, implementations facilitate an end-user's determination whether particular data is to be distributed to particular data consumers through a super-platform. Moreover, by providing data consumers with trust metrics that indicate a level of trust in the data providers (e.g., end-users and/or individual platforms) that provide data to a super-platform, implementations facilitate a data consumer's determination whether to purchase or otherwise acquire data. Accordingly, by facilitating data transactions between parties (e.g., end-users and data consumers) through the super-platform, implementations provide technical advantages over traditional systems in which the parties may not have the advantage of trust metrics when determining whether to participate in a transaction. In particular, traditional systems may consume more processing power, memory, storage, network bandwidth, and/or other resources given that transaction decisions may proceed more slowly, and with greater chance for error, on traditional systems that do not facilitate transaction decisions using trust metrics.

In some implementations, a data store is provided with lifelong, immutable provenance, achieved through the automated integration and addition of metadata to new and existing data assets. At least some implementations further provide extensible in-flight analytics, which can also function as a platform, allowing for third party developers to publish models and algorithms. In some implementations, aggregation features allow for on-the-fly assembly of data assets based upon requirements. At least some implementations further provide the ability to autonomously scrub data prior to sharing to minimize re-identification risks. In some implementations, analytics are provided as super-platform based and/or cloud based analytics. Scalability may be achieved through a platform-of-platforms architectural approach, as described further below. Stakeholders in the platform can rate data assets for cleanliness, ease of use, support, updates, and/or other aspects. Stakeholders may also rate data disclosers (e.g., for consistency, quality, and/or responsiveness), data manipulators (e.g., for cost, scientific rigor, and/or ability to handle a variety of complex transformations), and/or data consumers (e.g., for ethical behavior).

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure include systems, devices, methods, and computer-readable media for determining and employing trust metrics for entities interacting with a super-platform. An end-user may interact with multiple individual (e.g., siloed) platforms of different types or that support different business purposes or industries. The individual platforms may generate data describing, and/or resulting from, these interactions with end-user(s). The data from the various individual platforms may be received, ingested, stored, analyzed, aggregated, and/or otherwise processed by a super-platform. The super-platform may receive data generated by multiple platforms of different types, and provide the data, aggregate data, and/or data analysis results to data consumer(s) through a marketplace associated with the super-platform. In some implementations, a trust metric may be determined that indicates a trust level of an entity that is associated with the super-platform. For example, a trust metric may indicate the trust level of an individual platform, an end-user of individual platform(s), and/or a data consumer.

As used herein, super-platform refers to a computing system that includes any number of computing devices executing any number of software modules to receive, analyze, aggregate, store, distribute, and/or otherwise process data generated by any number of individual platforms. In some instances, the super-platform may be separate from the individual platform(s) and configured to communicate with the platform(s) using one or more networks. In some instances, the super-platform may share computing hardware and/or software resources with at least one of the individual platforms that is generating data. The super-platform may be configured to process data generated by multiple individual platforms that provide different types of services, as described further below.

In some implementations, various types of entities (e.g., individuals, computing devices, processes, etc.) may interact with the super-platform. Such entities may include data disclosers (e.g., data providers), data manipulators, and data consumers. A data discloser may be any entity that generates and/or provides the data to the super-platform. A data discloser may also be any entity that causes the data to be generated and/or provided to the super-platform. For example, an end-user of individual platform(s) may be a data discloser. An individual platform may also, itself, be a data discloser. A data manipulator may be any entity that analyzes, aggregates, and/or otherwise processes the data. For example, the super-platform and/or the various processes executing on the super-platform may be described as data manipulators. In some instances, the individual platforms and/or end-users may be data manipulators as well as possibly data disclosers, e.g., in scenarios where the data discloser manipulates the data in some way prior to disclosing the data to the super-platform. A data consumer may be any entity that receives the data and/or any information that is generated through manipulation of the data (e.g., aggregate data, analysis results, etc.). A data consumer may purchase or otherwise acquire information from the super-platform. In some instances, a data consumer may also be a data manipulator and/or data discloser. For example, a data consumer may purchase a set of data from the super-platform, analyze (e.g., manipulate) the data to produce analysis result(s) and/or other data set(s), and sell (e.g., disclose) the analysis result(s) and/or other data set(s) to the super-platform, individual platform(s), and/or other entities. Accordingly, a particular entity may operate in accordance with one or more of the roles of data discloser, data manipulator, and/or data consumer depending on the particular circumstances.

Figure 1:
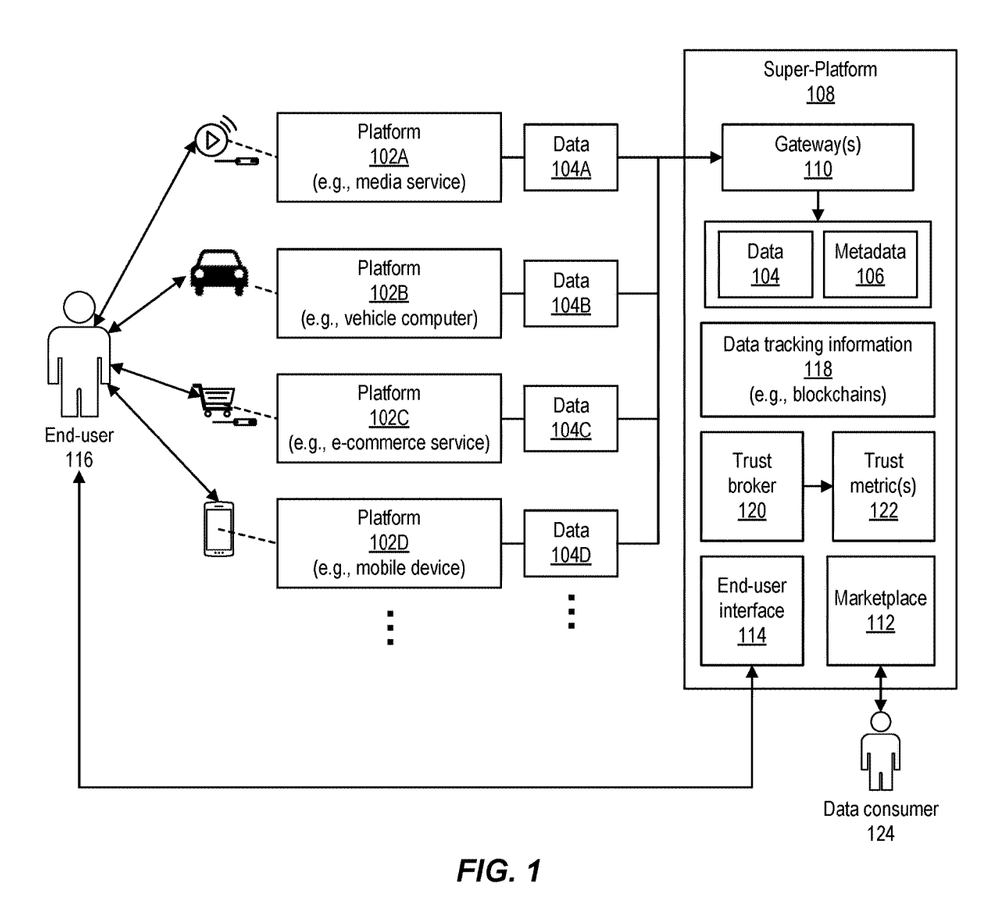
FIG. 1 depicts an example system for determining and employing trust metrics for entities interacting with a super-platform, in accordance with implementations of the present disclosure.

FIG. 1 depicts an example system for determining and employing trust metrics for entities interacting with a super-platform, in accordance with implementations of the present disclosure. As shown in the example of FIG. 1, an end-user 116 may interact with multiple, different individual platforms 102. Each of the individual (e.g., siloed) platforms 102 may generate data 104 describing the end-user's interactions with the platform 102. In some implementations, the individual platforms 102 may provide different types of services, and/or may be different types of platforms that support businesses or other organizations in different types of industries. The platforms 102 may include, but are not limited to, one or more of the following:

A computing device, which may be a mobile or portable computing device such as a smartphone, tablet computer, notebook computer, personal data assistant (PDA), wearable computer (e.g., watch device or glasses device), and so forth;

An in-vehicle (e.g., automotive) computer that is a component of a commercial or personal-use vehicle or otherwise in communication with a vehicle, the in-vehicle computer configured to collect telematics data, data regarding the operations (e.g., speed, braking, gas mileage, etc.) of the vehicle, characteristics of the vehicle (e.g., temperature, fuel status, fluid status, etc.), location information, environment information (e.g., temperature, air pressure, etc.), and so forth;

Online services for streaming or otherwise delivering content over a network (e.g., the internet), such as video content, audio content (e.g., music), audio-visual content (e.g., films, television, etc.), games, graphics, images, or other media;

Online shopping or other e-commerce services that offer products or services through a web site, a native application, or other type of interface;

Computing systems, such as point-of-sale terminals, servers, data storage devices, and so forth that are associated with physical (e.g., brick-and-mortar) stores or other commercial enterprises, the computing systems collecting or otherwise generating data based on in-store customer activities;

Internet-of-things (IoT) computing devices, such as smart appliances, home entertainment devices, or other devices present in a home, business setting, or elsewhere, and configured to include processing, memory, and communications capabilities in a device used for other purposes, such as smart washing machines, heating and air conditioning systems, audio or video presentation systems, and so forth; or An analytics cloud or other distributed computing system, such as a social media analytics cloud (SMAC).

A platform 102 may include a technical (e.g., hardware and/or software) architecture, governance rules, and one or more technology services that support the creation and execution of applications. Such applications may be specific to a particular industry associated with the platform 102. For example, platforms 102 that are vehicle computing systems, brick-and-mortar retail support systems, health care provider systems, or health insurance portals may provide and support applications associated with vehicle operations, retail operations, health care operations, or health insurance operations respectively. A platform 102 may provide a blueprint for how a business or other organization may build, connect, and deliver applications specific to problems in their associated industry. A platform 102 may serve as a pool of reusable functionality and capabilities to make building and evolving applications fast and easy, and may help companies or other organizations achieve better business outcomes. A platform 102 may also serve as a business model strategy that creates competitive differentiation. In a platform-based business, others outside a company may create value for the enterprise and, in some examples, enable new digital models for the company.

A platform 102 may include any number of applications (e.g., apps), and service layers or plug-in modules that support one or more features. Example features include financial transactions, authentication, logon, navigation, search, advertisement, marketplaces, or any other appropriate feature. An individual platform 102 may include hardware, software, or both hardware and software components.

For example, a platform 102 that is an in-vehicle (e.g., telematics) or other type of computing system may include hardware components such as processor(s), memory, network interfaces, and so forth, as well as software components such as an operating system, firmware, or any number of applications or processes executing on the hardware component(s). As another example, a platform 102 that is an e-commerce or media streaming service may include any number of web servers, application servers, applications, or other software component(s) that execute on one or more computing devices to enable an end-user 116 to view content or interact with the platform 102 through a user interface (UI).

The individual platforms 102 may each generate data 104 that is associated with end-user(s) 116, such as data describing user identity, user characteristics, user activities, user purchases, content browsed by the user, and so forth. In some examples, the data 104 may be provided to the platform(s) 102 by the end-user 116, or may be otherwise generated based on the end-user's interactions with the platform 102. The data 104 may include personally identifiable information (PII) of the end-user 116, such as user name(s), address(es), telephone number(s), login information (e.g., credentials) to access the individual platform 102, or other information that may enable identification of the particular end-user 116 or that is particularly associated with the end-user 116. The data 104 may also include other types of information that are associated with the particular end-user 116, but not necessarily explicitly provided by the end-user 116, such as information describing inferred or measured user characteristics (e.g., demographic characteristics), user activities on the platform 102, user purchase history, browsing data, clickstream data, and so forth. In some examples, the collected data 104 may include data that is generated by an individual platform 102 but that is not specific to a particular end-user 116. For example, an individual platform 102 that is a vehicle or in-vehicle telematics device may provide data 104 that is collected by sensors of the vehicle, such as data describing temperature, air pressure, location, velocity, vehicle operational state, or other information. As another example, a platform 102 that is a computing device may generate and provide data 104 describing the location of the device, used and available memory capacity, used and available processing capacity, used or available storage capacity, installed or executing applications, hardware configuration, software configuration, and/or other information that is not specifically associated with an end-user.

The data 104 generated by the platform(s) 102 may include any number of data objects. As used herein, a data object may include any size or amount of data that is arranged according to any format, or unformatted. A data object may include data of any type, and may include data that is compressed or uncompressed, encrypted or unencrypted. In some examples, a data object may include a particular amount of data and may be arranged according to a format such that the data object has a particular size when communicated. Data object(s) may also include a stream of data that continues for any duration to communicate any amount of data until the end of the stream. Data object(s) may be communicated in a sequence corresponding to an order of the data included in the data object(s). The data object(s) may also be communicated out of sequence, and may include sequence indicators or order indicators that enable a receiving process to reorder the received data object(s) into the order in which they were generated.

The data 104 generated by the individual platforms 102 may be sent to a (e.g., centralized) super-platform 108. For each individual platform 102, the super-platform 108 may include a gateway 110 that operates as an interface to receive the data 104 from the individual platform 102. The super-platform 108 may store the data 104, and may perform operations on the data 104 to process, store, analyze, aggregate, or otherwise handle the data 104. The super-platform 108 may include any number of software modules executing on any number of computing devices. Such software module(s) may include a marketplace 112, the gateway(s) 110, an end-user interface 114, and/or a trust broker 120. In some examples, the super-platform 108 may be implemented as a cluster or other group of server computers configured to execute the software module(s) that provide and support a super-platform service to ingest data 104, analyze, aggregate, or otherwise process the data 104, and provide the data 104 through the marketplace 112 to data consumer(s).

In some implementations, the super-platform 108 may execute one or more modules that aggregate the data 104 to generate aggregate data. Data aggregation may aggregate data 104 associated with a single user of one or more platforms 102. Data aggregation may also aggregate data 104 from multiple users. For example, data aggregation may generate data sets for particular segments of users, such as users having particular demographic characteristics, location, demonstrated interest in products or services, and so forth. Aggregate data may include, or be generated based on, data that describes or identifies users, such as PII for one or more users. Aggregate data may also include, or be generated based on, data that is not associated with users, such as sensor data. The super-platform 108 may aggregate data 104 received from different platforms 102 that support different types of operations or that are associated with different industries. For example, the super-platform 108 may aggregate data 104 from an end-user's smartphone, from a brick-and-mortar retail business where the end-user shops, from the end-user's in-vehicle telematics device, and from a streaming video service used by the end-user.

In some implementations, data 104 may be tagged or otherwise associated with metadata 106 that describes various aspects of the data 104. For example, a temperature value in the data 104 may be associated with metadata 106 identifying that particular portion of data 104 as a temperature value, or the metadata 106 may indicate the unit of measure of that portion of data 104. In some examples, metadata 106 may describe the source of the data 104, such as the individual platform 102 that generated the data 104, the particular end-user whose interactions with the individual platform 102 caused the generation of the data 104, and so forth. The metadata 106 describing the source platform 102 may enable the super-platform 108 to perform various (e.g., unique or targeted) functions with regard to the data 104. For example, metadata 106 identifying the source platform 102 may enable the data 104 to be retracted from use, or recalled from distribution, if it is later determined that the data 104 from the platform 102 is inaccurate in some way. Metadata 106 may also identify a particular hardware or software component of the platform 102 that generated the data 104. For example, after ingestion of data 104 the individual platform 102 that supplied the data 104 may determine that a particular sensor that generated the data 104 is faulty, and the platform 102 may request that the super-platform 108 prevent further use of data 104 from that particular sensor. As another example, the super-platform 108 may perform operations to remove the faulty data 104 from aggregate data, statistically correct for the inclusion of faulty data 104, or other operations, such as to offset a calibration abnormality of the sensor.

For a particular portion of data 104, the super-platform 108 may determine as much metadata 106 as possible to describe the data 104. In this way, the super-platform 108 may be described as a metadata-rich environment that enables the data 104 to be interrogated or otherwise analysis in various ways, even in ways not anticipated when the data 104 was generated or received at the super-platform 108. Metadata 106 may indicate a source of the data 104, such as one or both of the end-user 116 or individual platform 102 that generated the data 104. Metadata 106 may also indicate an owner of the data 104 at various stages in the data lifecycle of generation. The data lifecycle may include: ingestion by the super-platform 108; processing (e.g., analysis, aggregation, etc.); storage; distribution to data consumer(s); and deletion or retirement of the data 104. In some implementations, the metadata 106 is formatted according to a Resource Description Framework (RDF) or any other metadata format.

In some implementations, an individual platform 102 may provide metadata 106 with the data 104 that is ingested into the super-platform 108. In examples where an individual platform 102 does not provide metadata 106, or provides incomplete metadata 106, the super-platform 108 may generate metadata 106 for the ingested data 104. This generation of metadata 106 may be through a natural language (NL) or semantic analysis of the ingested data 104. In some examples, the super-platform 108 may generate metadata 106 such as location tags or time tags for the ingested data 104, e.g., based on other information indicating a location of the platform 102 or a time when the metadata 106 was generated or received. In some examples, the super-platform 108 may infer or otherwise determine metadata 106 for a portion of data 104 based on a semantic or format-based analysis of the data 104 to match the data 104 with one or more known patterns or formats of data. For example, if the data matches a known pattern or format for (e.g., "looks like") a value for air pressure, the data 104 may be tagged as air pressure data. The super-platform 108 may also add metadata 106 based on context information that is known about the individual platform 102 or the end-user.

In some examples, the super-platform 108 may also flag data 104 that the super-platform 108 is unable to reliably tag automatically with an adequate degree of confidence in the tagging. The flagging of data 104 that cannot be tagged may lead to a manual review and manual determination of metadata 106 for the data 104. In some examples, metadata tagging may be performed at a higher level or with less detail describing the data 104. For example, it may be sufficient to know that a particular portion of data 104 is describing a movie, without knowing which particular aspect (e.g., title, genre, plot synopsis, cast, etc.) is being described by the data 104.

In some implementations, data ingestion includes the normalization of data 104 received from different individual platforms 102. Such normalization may impose a common format for the metadata 106, or for the data 104 itself, in situations where different individual platforms 102 provide data 104 or metadata 106 in different formats, styles, data types, and so forth. Normalization may also include determination that different sets of data 104 from different individual platforms 102 are associated with the same end-user, in examples where the different individual platforms 102 employ a different user identifier for the end-user. In such examples, normalization may generate or alter metadata 106 to use a same user identifier to identify the same end-user. Normalization may normalize data 104 received from different countries or other geographical regions, to normalize the data 104 or metadata 106 to employ a same system of measurement, language, or other format.

In some implementations, the super-platform 108 may determine and employ a semantic data model that describes the ingested data 104 for a single platform 102 or for multiple platforms 102. The semantic data model may sit on top of the metadata 106 and provide a framework or set of relationships that describes multiple portions of data 104 having different metadata 106. For example, a semantic data model may describe a movie and may describe relationships between differently metadata-tagged portions of data, such as a relationship between movie title, description, cast, studio, format, length, genre, and so forth. The semantic data model may be described as a structure or map of the data 104, and may be determined based on the metadata 106. In some examples, the semantic data model may be hierarchical. For example, data 104 describing a refinery may include multiple gauges, valves, or other components, and those components may have sub-components, which may themselves have sub-components, and so forth.

The super-platform 108 may be configured to dynamically adapt to the addition of new individual platforms 102 by determining how the data 104 provided by a new individual platform 102 fits into an existing semantic data model that describes previously ingested data 104 from other platform(s) 102. Capabilities of the newly added individual platform 102 may be determined by analogizing or otherwise comparing to the new platform 102 to existing, similar individual platforms. For example, a new platform 102 may be associated with the semantic data model of a currently supported platform 102 that is similar to the new platform 102 with regard to type of platform, hardware or software configuration, type of service provided by the platform, format of the data, mechanism(s) for accessing and/or receiving the data from the platform, or other characteristics of the platforms. In some implementations, machine learning may be employed to determine the semantic data model and/or other capabilities of a newly available platform 102. Machine learning algorithm(s) may examine data sets that are sufficiently described by metadata 106 and, using the metadata 106, may apply a semantic data model to a new data set from a new platform 102 that might extend, augment, improve, or stand alongside an existing data set from current platform(s) 102.

The super-platform 108 may also execute one or more software modules to provide a marketplace 112 that enables potential data consumer(s) 124 to request various data set(s) of the collected data 104, set(s) of aggregate data, and/or result(s) of data analysis job(s). The end-user 116 may access an end-user interface 114 provided by the super-platform 108. Through the end-user interface 114, the end-user 116 may specify one or more restrictions on the use, sale, distribution, or other handling of the data 104 associated with the end-user 116. The end-user 116 may also employ the end-user interface 114 to specify pricing information indicating a price for one or more portions of data 104 associated with the end-user 116.

The super-platform 108 may exhibit at least three characteristics including security, transparency, and privacy. Security ensures that data 104, aggregate data, and/or analysis results are not shared with inappropriate entities. Security may be provided by encrypting the data 104, aggregate data, and/or analysis results, securing the systems that store and process the data 104 to prevent unauthorized access, and/or arranging the data storage to hinder unauthorized access (e.g., distributing a particular piece of data across multiple records). Privacy may ensure that information such as PII remains confidential. Transparency may ensure that some or all of the entities associated with the super-platform 108 (e.g., end-user(s) 116, platform(s) 102, and/or data consumer(s) 124) may access information regarding the handling of the data 104. Traditional solutions generally fail to achieve all three characteristics—security, transparency, and privacy—given the possible tension or conflict between these aspects.

In the super-platform 108, a portion of data 104 (e.g., one or more data objects) generated from one of the individual platforms 102 may be received, and data tracking information 118 may be created for the portion of data 104. In some implementations, the data tracking information 118 may include a blockchain for each portion of data 104. Implementations also support the use of other types of data structures for the data tracking information 118. The data tracking information 118 may include a record of each instance in which the data 104 was involved in some activity or transaction. For example, the data tracking information 118 may record events describing the receipt, storage, aggregation, transformation, sale, analyzing, archiving, or disposal of the data 104. The data tracking information 118 may also record which entity owns the data 104 at any given time, or which entity has been given access to the data 104. In this way, the data tracking information 118 may include metadata that describes the propagation and/or lifecycle of a portion of the data 104. The data tracking information 118 may also include the metadata 106. The data tracking information 118 may include a pointer to the stored data 104, which may be securely stored in a datastore.

The entities associated with the super-platform 108, such as data providers (e.g., end-users 116 and/or individual platforms 102) and/or data consumers 124, may be able to access the information stored in the data tracking information 118. Access to the data tracking information 118 provides transparency into the transactions and ownership of the data 104 as it is processed and/or transferred among entities. In some examples, the data 104 may be securely stored separately from the data tracking information 118. In this way, the super-platform 108 may provide transparency into the handling and lifecycle of the data 104 while maintaining the privacy and/or security of the data 104. The information in the data tracking information 118 may be secured using a cryptographic hash or other techniques.

In an example scenario, a data consumer 124 may want to do a marketing study using a large dataset including the data associated with a plurality of end-users 116. The data consumer 124 may access the marketplace 112 and provide a description of their study and their data needs, indicating the particular characteristics of the desired data records. The data consumer 124 may agree to pay a certain amount per record (e.g., $1/record), or an amount for the entire dataset. Some records may be priced differently than others. For example, the data consumer 124 may be willing to pay $1 for each record that satisfies all the desired characteristics, but 50 cents for each record that satisfies only some of the characteristics. Once the transaction is finalized, the data tracking information 118 for each data record (e.g., data object) sold may be updated to include information regarding the sale, the terms of the sale, and the data consumer 124 who bought the data. Because the data tracking information 118 is transparent, the end-user 116 can query the system using the end-user interface 114 to receive information regarding the data consumer 124 that purchased their data, how their data is being used, whether restriction(s) on the data are being followed, and so forth. The end-user 116 may see that the user's data record has been sold to the data consumer 124 for a certain amount, and that the data consumer 124 is using the data for marketing research. The end-user 116 may also access information indicating that the end-user 116 has profited a certain percentage of the sale amount, e.g., after the super-platform 108 and/or marketplace 112 takes out its brokerage fee. If the end-user 116 opted in to allow the data consumer 124 to sell the data 104 to one or more other third parties, the data tracking information 118 may show that the data consumer 124 sold the data to one or more other parties for 10 times what Target paid for the data initially. In that example, the end-user 116 may receive a portion of the additional revenue. In this way, the data tracking information 118 may provide the end-user 116 with transparency into how that particular user's data has been handled. The data tracking information 118 may also provide the end-user 116 with transparency regarding the amount that the end-user 116 has been paid, or is owed, for the data 104 that has been used, sold, or otherwise processed. The super-platform 108 and/or marketplace 112 may also enable the end-user 116 to renegotiate the terms of use and/or the price for their data 194 if the end-user 116 learns, through the data tracking information 118, that the data 104 may be more valuable.

Such transparency into the use and/or distribution of data 104 enables the operation of a trust framework within the super-platform 108. The trust framework may allow each entity in the super-platform 108 and/or marketplace 112 to provide a trust rating for one or more other entities, the trust rating indicating a level of trust in the entity. The multiple trust ratings for an entity may be combined (e.g., averaged) to generate a trust metric 122 for that entity. For example, an end-user 116 may provide a trust rating for a data consumer 124 based on whether the data consumer 124 is adhering to their promises regarding how their use the data 104 and/or whether the data consumer 124 has paid the promised price for the data 104, as indicated in the data tracking information 118 for the data 104. As another example, a data consumer 124 may provide a trust rating for an end-user 116 and/or an individual platform 102, based on whether the data consumer 124 believes the data generating party (e.g., end-user or individual platform) is legitimate and provides accurate, reliable, and/or authentic data 104. In some examples, entities may rate one another on a scale of 1 to 5, with 5 being the highest trust level and 1 the lowest. The super-platform 108 may include a trust broker 120 (e.g., an executing software process) that executes to calculate the trust metric 122 for an entity based on the individual trust ratings for the entity. In some examples, the trust broker 120 or another process may determine, based on trust metric(s) 122, whether access is to be granted to data 104. For example, the trust broker 120 may prevent a data consumer 124 from accessing certain data records if the data consumer's trust metric 122 is below a threshold level, and/or may enable the data consumer's access based on the trust metric 122 exceeding a threshold level.

Trust ratings may improve over time as the number of users of the system increases. In some implementations, there are three distinct roles of entities that interact with the super-platform: data disclosers, data manipulators, and data consumers. Each of these participants may be able to rate any of the other participants across a range of metrics, provided there is a direct relationship between the rating participant and the entity being rated. For instance, if a data consumer buys the right to use a data set provided by a data discloser and performs data analysis directly on the data set, the data consumer may rate the data discloser. In some instances, there may be a manipulation of the raw data before the data consumer uses it. In such instances, the data consumer may be able to rate the data manipulator in addition to or instead of the data discloser. In such instances, the data manipulator may rate the data discloser. In some situations, the data consumer may rate the manipulator poorly who in turn may rate the discloser poorly. In such situations, a determination may be made that the data set is not good for that particular task and the learning engine may benefit from this determination.

Through the end-user interface 114, an end-user 116 may have visibility into the current trust metric 122 for a data consumer 124 and, based at least partly on that trust metric 122, decide whether to allow the data consumer 124 to use, analyze, resell, or otherwise handle the data 104 associated with the end-user 116. Moreover, a data consumer 124 may, e.g., through the marketplace 112, have visibility into the trust metric 122 for a data provider such as an end-user 116 and/or an individual platform 102. Based on the trust metric 122, the data consumer 124 may decide whether to trust the data 104 generated by the data provider. In some examples, a data consumer 124 may receive an increase in their trust metric 122 if they provide some visibility into their use of the data 104. For example, a data consumer 124 may purchase a data set that is to be analyzed to generate another data set, to perform published research, or to engage in other activities regarding the data 104. If the data consumer 124 makes the resulting data set or publication available for access through the super-platform 108, and if the results data set or publication is consistent with the use that the data consumer 124 originally claimed when they acquired the data 104 though the marketplace 112, then the data consumer 124 may be given an increase in their trust metric 122 automatically and/or through subsequently higher trust ratings from end-user(s) 116. In some examples, the marketplace 112 may enable the data consumer 124 to sell the results data set.

In some examples, an agent (e.g., software process) may execute on computing device(s) of the data consumer 124 to verify that the data consumer 124 received the purchased data 104 and is using the data 104 for the purposes they indicating when buying the data 104. In some examples, the agent may monitor the data consumer's compliance (or non-compliance) with the restriction(s) set on the use of the data 104. The agent may also monitor whether the data consumer 124 is using the data 104 for the purpose indicated by the data consumer 124. The results of such monitoring, e.g., the compliance or non-compliance with restriction(s) and/or stated purpose, may be communicated to the trust broker 120. The trust broker 120 may adjust the data consumer's trust metric 122 based on the compliance and/or non-compliance with restriction(s) and/or stated purpose.

In instances where the entire transaction and data manipulation happen on the super-platform, the super-platform may apply safeguards to prevent unintended use of the data. Alternatively, a data consumer may wish to use their own analytics appliance and/or cloud to perform analytics. In those situations, only certain data sets may be available to data consumers for "offline processing" in some implementations. To receive these data sets, a data consumer may be required to install and execute a client-side agent and/or daemon on their computing device(s). This agent and/or daemon may be responsible for download management, data encryption, data decryption, and/or use case submission and validation. Regardless of where the analysis is performed (e.g., on the super-platform or data consumer device(s)), an autonomous AI auditing engine may used to monitor compliance. When anomalies between stated and actual use are detected, a flag may be thrown and the incident may be automatically reported to the super-platform for further inspection (e.g., by an informed human compliance officer). If the inspection verifies that improper action(s) were performed, the case may be escalated and the data consumer may receive a low (e.g., 1- or 2-star) rating from the compliance officer or other inspection entity, depending on severity of the issue. If the use is illegal, the case may also be referred to the appropriate authorities and a minimum (e.g., 1-star) rating may be issued for the data consumer.

In some implementations, the trust metric 122 for a data provider (e.g., end-user 116 or platform 102) may be tracked in the data tracking information 118 for the data 104 along with other metadata 106 describing the data 104. In some implementations, the data tracking information 118 may include a separate metric describing the accuracy and/or fidelity of the data 104, and the accuracy metric may be determined independently of the trust metric 122. In some examples, a data provider may have a high trust metric 122 but, due to the nature of the platform 102 or its sensing capabilities, the data provider may generate a particular type of data that is less accurate than similar data provided by other platforms. For example, a data provider may provide location data that is accurate to within a mile in comparison to other data providers that may provide more precise location measurements. In some instances, a platform may be trusted that it is providing accurate though low-fidelity and/or coarse-grained data 104.

In some instances, a data provider (e.g., end-user 116 or individual platform 102) may initially establish a trust metric 122 by providing credentials or identifying information that is externally validated, such as a driver's license, passport, business license, and so forth. In some instances, an individual platform 102 may vouch for the trustworthiness of the end-users 116 who use the individual platform 102, based on the end-users' history of interactions with the individual platform 102. For example, a platform 102 may vouch for the trustworthiness of an end-user 116 based on a lack of fraudulent or suspicious behavior by the user, authentication of the user, the user being a long-time customer, and/or other consideration(s). Such information may be employed to determine an (e.g., initial) trust metric 122 for an end-user 116. The trust metric 122 for a data provider that is a business or other organization may also be based at least partly on a trust level associated with individual employees or personnel within the organization.

In some instances, the trust metric 122 for a data provider (e.g., end-user 116 or individual platform 102) may be incorporated as metadata 106 into the data tracking information 118 for the particular data records generated by the data provider. In examples where data records are aggregated to generate another data set, that other data set may be associated with data tracking information 118 that includes an aggregate trust metric. The aggregate trust metric may be generated based on the combination of the various individual trust metrics 122 for the data records that were aggregated to form the aggregate data set. In this manner, the trust metric 122 may propagate with the data records even in instances where data 104 is aggregated, anonymized, or otherwise processed to obfuscate the identity of the end-user 116 and/or platform 102 that originally generated the data 104. The data tracking information 118 for records of the aggregate data set may include a pointer back to the data tracking information 118 for the constituent data records that were used to form the aggregate data set. Similarly, the data tracking information 118 for the constituent data records may include pointers to the aggregate data tracking information 118. Implementations support the use of various algorithms to determine an aggregate trust metric based on the individual trust metrics of constituent data records? For example, the aggregate trust metric may be an average the individual trust metrics. As another example, the aggregate trust metric may be the lowest of the individual trust metrics. In some instances, if a reviewer has a higher reputation and/or rating themselves, their reviews may be assigned a greater weight (e.g., compared to other reviewers) when determining the aggregate trust metric.

Figure 2:
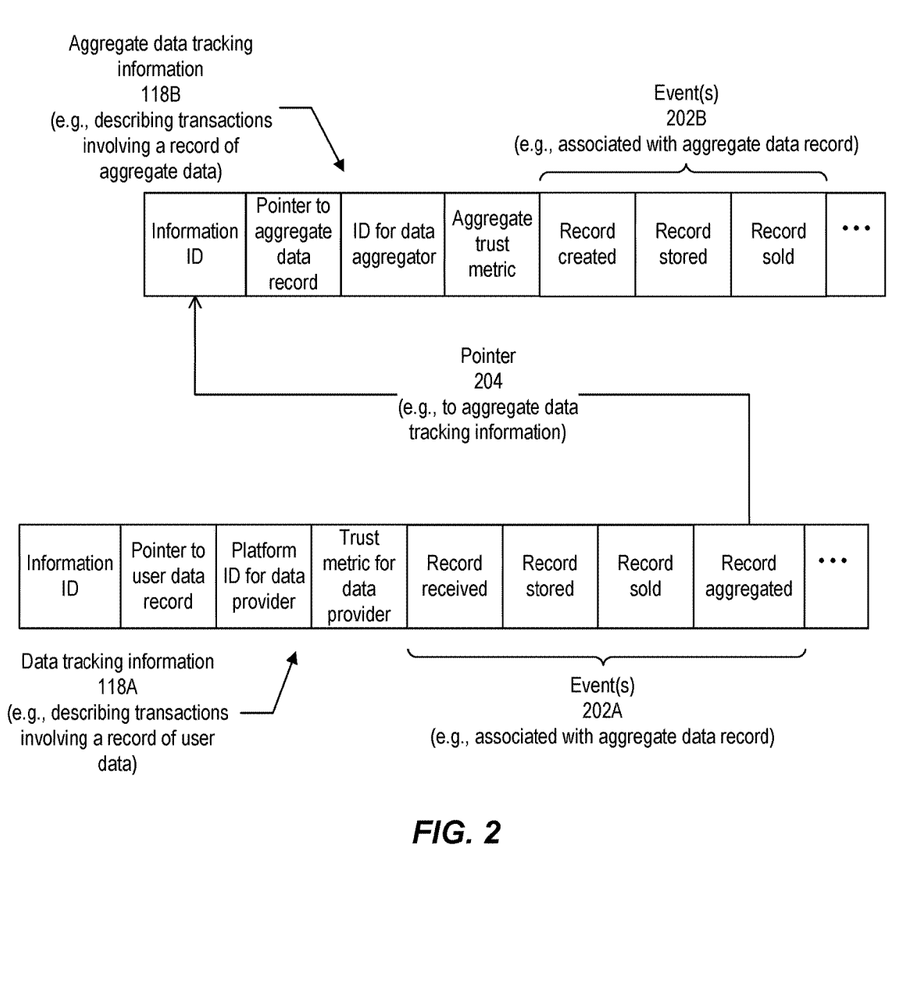
FIG. 2 depicts an example of data tracking information for a portion of data and aggregate data, according to implementations of the present disclosure.

FIG. 2 depicts an example of data tracking information for a portion of data 104 and aggregate data, according to implementations of the present disclosure. As shown in the example of FIG. 2, data tracking information 118A for a portion of data 104 may include an information identifier that (e.g., uniquely) identifies the data tracking information 118A for a particular portion of data 104. The data tracking information 118A may include a pointer that points to a location (e.g., in data storage) where the corresponding portion of data 104 is stored. In some implementations, the data tracking information 118A may include a platform ID that identifies the data provider that generated and/or provided the data, such as the end-user 116 and/or platform 102. In some implementations, the data tracking information 118A may include a trust metric 122 for the data provider. The data tracking information 118A may also include one or more events 202A describing events in the lifecycle of the corresponding portion of data 104. Such event(s) 202A may include, but are not limited to, the receipt, storage, sale, aggregation, analysis, or other use and/or distribution of the portion of data 104. In instances where the event(s) 202A include an event 202 describing aggregate of the portion of data 104 with other data, the event 202 may include a pointer 204. The pointer 204 may identify aggregate data tracking information 118B that describes the aggregate data.

The aggregate data tracking information 118B for aggregate data may include an information ID that (e.g., uniquely) identifies the data tracking information 118B for a particular portion of aggregate data. The data tracking information 118B may include a pointer that points to a location (e.g., in data storage) where the corresponding portion of aggregate data is stored. In some implementations, the data tracking information 118B may include an ID of the data aggregator, such as a software module and/or device that aggregated the data. In some implementations, the data tracking information 118B may include an aggregate trust metric. As described above, the aggregate trust metric may be a combination of the trust metrics 122 of the individual data portions that were aggregated to generate the aggregate data. The data tracking information 118B may also include one or more events 202B describing events in the lifecycle of the corresponding portion of aggregate data. Such event(s) 202B may include, but are not limited to, the creation, storage, sale, or other use and/or distribution of the portion of aggregate data. In some implementations, the data tracking information 118B may include a pointer to the data tracking information 118A corresponding to each portion of data 104 that was aggregated. In some implementations, the data tracking information 118A and/or the data tracking information 118B may include at least a portion of the metadata 106.

In some implementations, the data tracking information 118A and/or 118B may also include a description of the reasons a data consumer and/or manipulator may have used the data (e.g., what was the data used for?). The data tracking information 118A and/or 118B may also indicate what entities interrogated the record and for what purpose.

In some implementations, the data tracking information 118 includes a blockchain for a portion of data 104, where a portion may be one or more records, one or more data objects, or any other amount of data 104. To provide further context for the present disclosure, a high-level discussion of blockchain technology is provided. In general, a blockchain is a public ledger of all transactions that have ever been executed in one or more contexts (e.g., negotiable instrument transactions, digital currency transactions, etc.). A blockchain constantly grows as completed blocks are added with a new set of transactions. In some examples, a single block is provided from multiple transactions (e.g., multiple deposits of different checks by different people). In general, blocks are added to the blockchain in a linear, chronological order by one or more computing devices in a peer-to-peer network of interconnected computing devices that execute a blockchain protocol. In short, the peer-to-peer network can be described as a plurality of interconnected nodes, each node being a computing device that uses a client to validate and relay transactions (e.g., deposits of checks). Each node maintains a copy of the blockchain, which is automatically downloaded to the node upon joining the peer-to-peer network. The blockchain protocol provides a secure and reliable method of updating the blockchain, copies of which are distributed across the peer-to-peer network, without use of a central authority.

Because all users (e.g., financial institutions) may need to know all previous transactions (e.g., deposits, withdrawals, etc.) to validate a requested transaction, all users may need agree on which transactions have actually occurred, and in which order. For example, if two users observe different transaction histories, they may be unable to come to the same conclusion regarding the validity of a transaction. The blockchain enables all users to come to an agreement as to transactions that have already occurred, and in which order. In short, and as described in further detail below, a ledger of transactions is agreed to, based on the amount of work required to add a transaction to the ledger of transactions (e.g., add a block to the blockchain). In this context, the work is a task that is difficult for any single node (e.g., computing device) in the peer-to-peer network to quickly complete, but is relatively easy for a node (e.g., computing device) to verify.

The peer-to-peer network includes so-called miners (e.g., computing devices) that add blocks to a blockchain based on the blockchain protocol. In general, multiple miners validate transactions that are to be added to a block, and compete (e.g., perform work, as introduced above) to have their block added to the blockchain. Validation of transactions includes verifying digital signatures associated with respective transactions. For a block to be added to the blockchain, a miner may demonstrate a proof of work before their proposed block of transactions is accepted by the peer-to-peer network, and is added to the blockchain. A blockchain protocol includes a proof of work scheme that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In some examples, the hash value is a one-way hash value, in that the hash value cannot be 'un-hashed' to determine what the input was. The blockchain protocol can require multiple pieces of information as input to the CHF. For example, the input to the CHF can include a reference to the previous (most recent) block in the blockchain, details of the transaction(s) that are to be included in the to be created block, and a nonce value (e.g., a random number used only once).

As introduced above, multiple nodes compete to hash a set of transactions and provide the next block that is to be added to the blockchain. The blockchain protocol provides a threshold hash to qualify a block to be added to the blockchain. For example, the threshold hash can include a predefined number of zeros (0's) that the hash value is to have at the beginning (e.g., at least the first four characters of the hash value are to each be zero). The higher the number of zeros, the more time-consuming it is to arrive at a qualifying hash value.

In accordance with the blockchain protocol, each miner in the peer-to-peer network receives transaction information for one or more transactions that are to be included in a block that is to be added next in the blockchain. Each miner provides the reference to the previous (most recent) block in the blockchain, details of the transaction(s) that are to be included in the to-be-created block, and the nonce value to the CHF to provide a hash value. If the hash value does not meet the threshold hash (e.g., the first four characters of the hash value are not each zero), the miner starts again to provide another hash value. If the hash value meets the threshold hash (e.g., at least the first four characters of the hash value are each zero), the respective miner successfully created the next block that is to be added to the blockchain. Consequently, the respective miner's block is broadcast across the peer-to-peer network. All other miners cease work (because one miner was already successful), and all copies of the blockchain are updated across the peer-to-peer network to append the block to the blockchain. Each miner may be required to produce hundreds or thousands of hash values, before any one miner provides a qualifying hash value (e.g., at least the first four characters of the hash value are each zero).

In some examples, the distributed ledger system can include one or more sidechains. A sidechain can be described as a blockchain that validates data from other blockchains. In some examples, a sidechain enables ledger assets (e.g., a digital currency) to be transferred between multiple blockchains.

Figure 3:
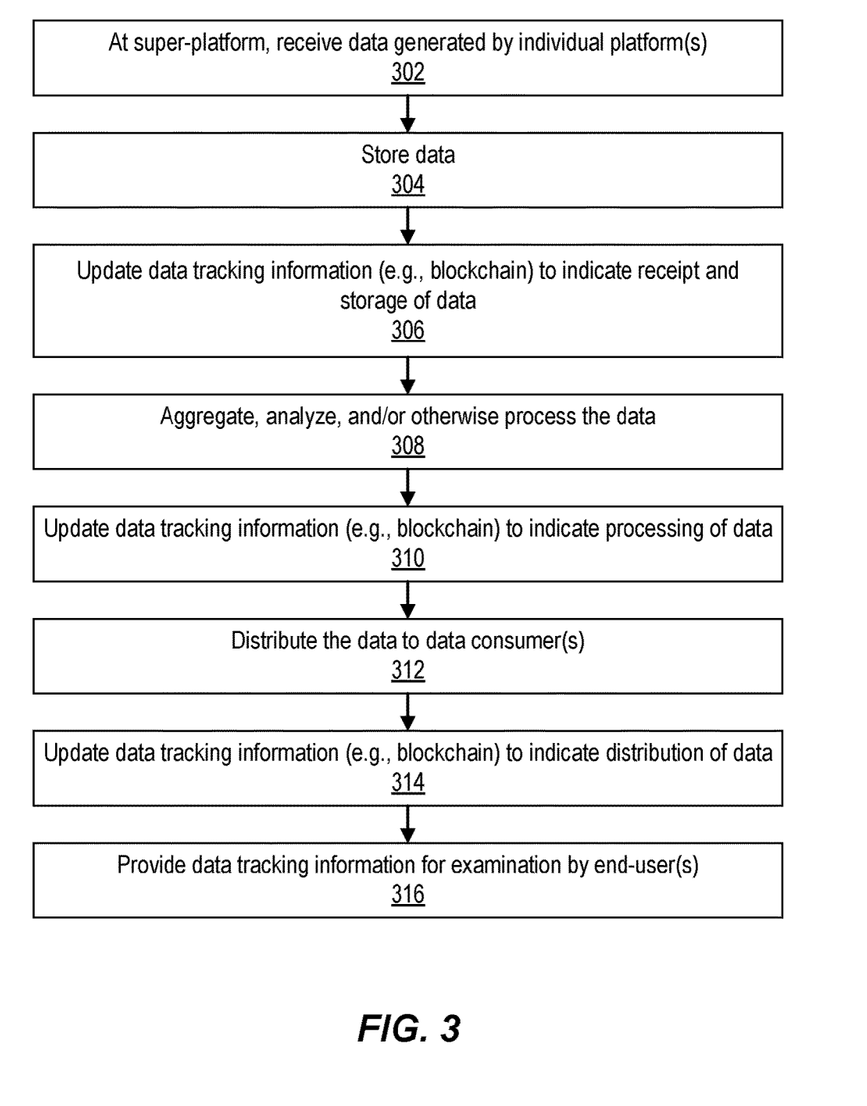
FIG. 3 depicts an example process for determining data tracking information that provides transparency into data use and distribution, in accordance with implementations of the present disclosure.

FIG. 3 depicts an example process for determining data tracking information 118 that provides transparency into data use and distribution, in accordance with implementations of the present disclosure. Operations of the process may be performed by one or more of the gateway(s) 110, the trust broker 120, the end-user interface 114, the marketplace 112, or other module(s) executing on the super-platform 108, the platform(s) 102, and/or elsewhere.

As described above, the data 104 generated by the platform(s) 102 may be received (302) at the super-platform 108, through the gateway(s) 110. The data may be stored (304). In some implementations, the data 104 may be analyzed as described above to determine metadata 106 that describes the data 104. In some examples, the metadata 106 may be received with the data 104 from the platform(s) 102. The data tracking information 118 associated with the received data 104 may be updated (306) to include event(s) 202 indicating the receipt and/or the storage of the data 104.

In some examples, the data 104 may be aggregated, analyzed, and/or otherwise processed (308) by software module(s) executing on the super-platform 108. In such examples, the data tracking information 118 associated with the data 104 may be updated (310) to include event(s) 202 indicating that the data 104 was processed. In instances where the data 104 is aggregated, data tracking information 118 for the aggregate data may be generated as described with reference to FIG. 2.

In some examples, the data 104 and/or aggregate data may be distributed (312) (e.g., sold) to one or more data consumers 124 through the marketplace 112. In such examples, the associated data tracking information 118 may be updated (314) to include event(s) 202 describing the distribution of the data 104 and/or aggregate data. Such event(s) 202 may indicate a date and/or time of the distribution, the data consumer(s) 124 that received the data 104 and/or aggregate data, and/or other information.

The data tracking information 118 associated with the data 104 and/or aggregate data may be provided (316) to end-user(s) 116 through the end-user interface 114, the marketplace 112, and/or through other channel(s). By enabling end-user(s) 116 to access the data tracking information 118, implementations provide end-user(s) 116 with visibility into the ways in which their data 104 is being used, analyzed, aggregated, sold, re-sold, or other events in the lifecycle of the data 104.

Figure 4:
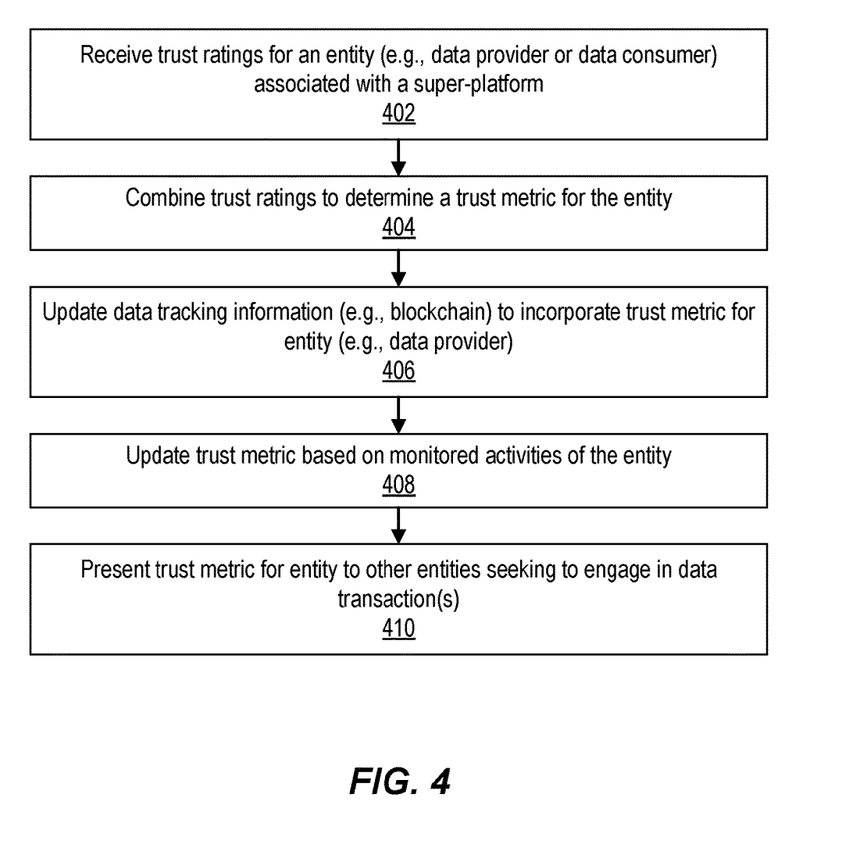
FIG. 4 depicts an example process for determining and employing trust metrics for entities interacting with a super-platform, in accordance with implementations of the present disclosure.

FIG. 4 depicts an example process for determining and employing trust metrics 122 for entities interacting with a super-platform 108, in accordance with implementations of the present disclosure. Operations of the process may be performed by one or more of the gateway(s) 110, the trust broker 120, the end-user interface 114, the marketplace 112, or other module(s) executing on the super-platform 108, the platform(s) 102, and/or elsewhere.

As described above, trust ratings may be received (402) for an entity that is associated with the super-platform 108, the trust ratings provided by other entities associated with the super-platform 108. For example, an end-user 116 may provide a trust rating that indicates their level of trust in a data consumer 124. As another example, a data consumer 124 may provide a trust rating that indicates their level of trust in the accuracy, legitimacy, and/or authenticity of data 104 provided by an end-user 116 and/or a platform 102.

The trust ratings may be combined (404) or otherwise analyzed to determine a trust metric 122 for the entity. Implementations support a variety of techniques for determining a trust metric 122 based on trust ratings. For example, the trust ratings may be averaged, or otherwise mathematically combined, to determine the trust metric 122.

In some implementations, data tracking information 118 for the data 104 may be updated (406) to incorporate the trust metric 122 for the data provider (e.g., end-user 116 and/or platform 102) that provided the data 104. As described above, in examples where the data 104 is aggregated with other data, the data tracking information 118 may also be updated to include an aggregate trust metric that is based on the individual trust metrics 122 of the aggregated data portions.

In some implementations, the activities of an entity may be monitored and the trust metric 122 for the entity may be adjusted (408) (e.g., increased or decreased) based on the monitored activities. The data tracking information 118 may be updated accordingly to include the updated trust metric 122. For example, a data consumer's activities may be monitored to determine whether the data consumer 124 complies with restrictions on the use of the data 104, and/or whether the data consumer 124 is using the data 104 in the manner that they indicated when acquiring the data 104. If the data consumer 124 complies with restriction(s) and/or indicated use, the trust metric 122 of the data consumer 124 may be increased. If the data consumer 124 fails to comply with restriction(s), and/or deviates from their indicated use of the data 104, their trust metric 122 may be decreased.

In some implementations, the trust metric 122 for an entity may be presented to other entities seeking to engage in data transactions or otherwise interact with the entity. For example, an end-user 116 may be presented (e.g., through the end-user interface 114) with an indication that a data consumer 124 has requested to buy the end-user's data. The end-user 116 may also be presented with the current trust metric 122 for the data consumer 124. Based on the trust metric 122 and/or the terms of the offer (e.g., price, indicated use, etc.), the end-user 116 may decide whether to accept or reject the offer to purchase data 104. As another example, a data consumer 124 may use the marketplace 112 to request a data set corresponding to end-user(s) 116 with particular demographic or other characteristics. The marketplace 112 may identify the data set and present trust metric(s) 122 for the various end-user(s) 116 whose data 104 is in the data set, and/or trust metric(s) 122 for the various platform(s) 102 from which the data 104 was collected. Based on the trust metric(s) 122, the data consumer 124 may decide whether to purchase the data set.

Implementations provide for a trust framework in which an entity associated with the super-platform is evaluated by other entities who may provide trust ratings regarding the evaluated entity. Because the super-platform may not enable a particular entity to sponsor and/or pay for (e.g., favorable) ratings from other entities, implementations provide a trust framework that may be more trustworthy than traditional review systems in which favorable reviews may be bought.

As described above, implementations provide the ability to interrogate the platform. Such transparent reporting provides an advantage over traditional systems for service ratings, reviews, and so forth. Moreover, implementations provide for interrogation that is not limited to a party in the transaction. In some implementations, anyone who is a registered and verified user of the super-platform may interrogate data, processes, and/or other users associated with the super-platform. In this way, implementations may provide a super-platform with transparency to facilitate trust relationships between entities and/or the super-platform itself.

Figure 5:
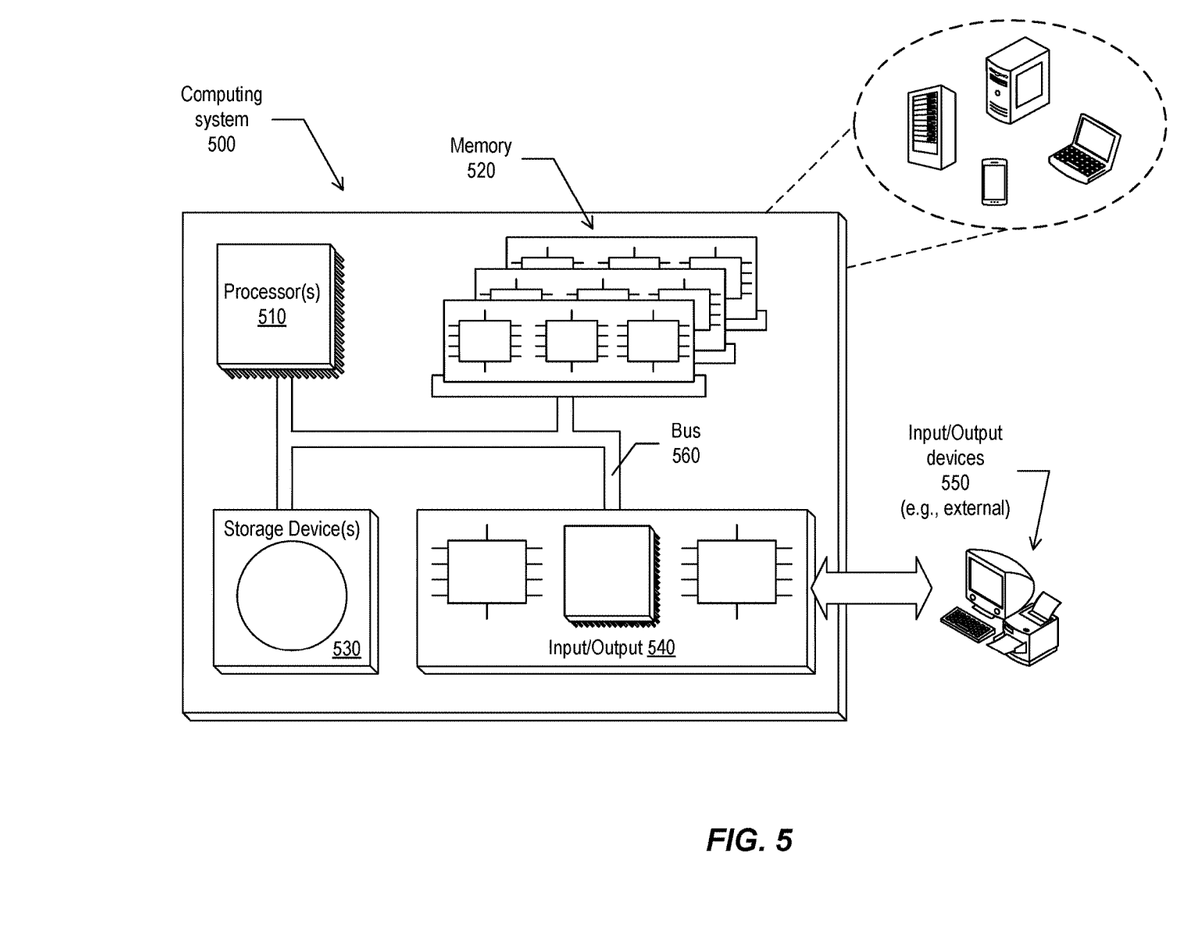
FIG. 5 depicts an example computing system architecture, in accordance with implementations of the present disclosure.

FIG. 5 depicts an example computing system 500 in accordance with implementations of the present disclosure. The system 500 may be used for any of the operations described with respect to the various implementations discussed herein. For example, the system 500 may be included, at least in part, in one or more of platforms 102, the super-platform 108, or other device(s) described herein. The system 500 may include one or more processors 510, a memory 520, one or more storage devices 530, and one or more input/output (I/O) devices 550 controllable through one or more I/O interfaces 540. Two or more of the components 510, 520, 530, 540, or 550 may be interconnected through at least one system bus 560, which may enable the transfer of data between the various modules and components of the system 500.

The processor(s) 510 may be configured to process instructions for execution within the system 500. The processor(s) 510 may include single-threaded processor(s), multi-threaded processor(s), or both. The processor(s) 510 may be configured to process instructions stored in the memory 520 or on the storage device(s) 530. The processor(s) 510 may include hardware-based processor(s) each including one or more cores. The processor(s) 510 may include general purpose processor(s), special purpose processor(s), or both.

The memory 520 may store information within the system 500. In some implementations, the memory 520 includes one or more computer-readable media. The memory 520 may include any number of volatile memory units, any number of non-volatile memory units, or both volatile and non-volatile memory units. The memory 520 may include read-only memory, random access memory, or both. In some examples, the memory 520 may be employed as active or physical memory by one or more executing software modules.

The storage device(s) 530 may be configured to provide (e.g., persistent) mass storage for the system 500. In some implementations, the storage device(s) 530 may include one or more computer-readable media. For example, the storage device(s) 530 may include a floppy disk device, a hard disk device, an optical disk device, or a tape device. The storage device(s) 530 may include read-only memory, random access memory, or both. The storage device(s) 530 may include one or more of an internal hard drive, an external hard drive, or a removable drive.

One or both of the memory 520 or the storage device(s) 530 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 500. In some implementations, the CRSM may include a data store that provides storage of computer-readable instructions or other information in a non-transitory format. The CRSM may be incorporated into the system 500 or may be external with respect to the system 500. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 510 and the memory 520 may be supplemented by, or incorporated into, one or more application-specific integrated circuits (ASICs).

The system 500 may include one or more I/O devices 550. The I/O device(s) 550 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 550 may also include one or more output devices such as a display, LED(s), an audio output device (e.g., a speaker), a printer, a haptic output device, and so forth. The I/O device(s) 550 may be physically incorporated in one or more computing devices of the system 500, or may be external with respect to one or more computing devices of the system 500.

The system 500 may include one or more I/O interfaces 540 to enable components or modules of the system 500 to control, interface with, or otherwise communicate with the I/O device(s) 550. The I/O interface(s) 540 may enable information to be transferred in or out of the system 500, or between components of the system 500, through serial communication, parallel communication, or other types of communication. For example, the I/O interface(s) 540 may comply with a version of the RS-232 standard for serial ports, or with a version of the IEEE 1284 standard for parallel ports. As another example, the I/O interface(s) 540 may be configured to provide a connection over Universal Serial Bus (USB) or Ethernet. In some examples, the I/O interface(s) 540 may be configured to provide a serial connection that is compliant with a version of the IEEE 1394 standard.

The I/O interface(s) 540 may also include one or more network interfaces that enable communications between computing devices in the system 500, or between the system 500 and other network-connected computing systems. The network interface(s) may include one or more network interface controllers (NICs) or other types of transceiver devices configured to send and receive communications over one or more networks using any network protocol.

Computing devices of the system 500 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 500 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

The features described may be implemented in digital electronic circuitry or in computer hardware, software, or any combinations of hardware and software. The features may be implemented in at least one computer program product that is tangibly embodied in an information carrier (e.g., a machine-readable storage device) for execution by a programmable processor. The method or process steps may be performed by a programmable processor executing instructions to perform functions of the described implementations by operating on input data and generating output. The described features may be implemented in one or more computer programs that are executable on a programmable system including at least one programmable processor coupled to receive data and instructions from, and to transmit data and instructions to, a data storage system, at least one input device, and at least one output device. A computer program may include a set of instructions that can be used, directly or indirectly, in a computer to perform a certain activity or bring about a certain result. A computer program may be written in any form of programming language, including compiled or interpreted languages, and it may be deployed in any form, including as a stand-alone program or as a module suitable for use in a computing environment.

The logic flows depicted in the figures do not require the particular order shown, or any particular sequential order, to achieve desirable results. In some implementations, other steps may be provided or steps may be eliminated from the described flows. Moreover, the steps may be performed in parallel or serially with respect to other steps. The systems depicted in the figures do not require the particular components, or the particular arrangement of components, shown in the figures. In some implementations, the various systems may include more or fewer components than shown in the figures, and components may be arranged differently to achieve desirable results. Accordingly, implementations other than those explicitly depicted in the figures or described herein are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method comprising:
    storing, on one or more storage devices associated with a super-platform, data generated at a plurality of individual platforms, the data associated with at least one end-user of the plurality of individual platforms;
    determining data tracking information including one or more events associated with the data, the one or more events including a distribution of the data to a data consumer, the data tracking information including a blockchain associated with the data;
    based at least partly on the data tracking information, determining a data consumer trust metric that indicates a level of trust in the data consumer;
    determining a data provider trust metric that indicates a level of trust in one or more of an end-user and an individual platform that generated the data, the data provider trust metric based at least partly on at least one trust rating provided by at least one data consumer;
    incorporating the data provider trust metric into the data tracking information associated with the data;
    aggregating the data from multiple individual platforms to generate aggregate data;
    determining aggregate data tracking information including one or more events associated with the aggregate data; and
    presenting the data consumer trust metric to the at least one end-user.

2. The method of claim 1, wherein the data tracking information includes an event that indicates the aggregating of the data and that includes a pointer to the aggregate data tracking information associated with the aggregate data.

3. The method of claim 1, further comprising:
    determining an aggregate trust metric for the aggregate data based at least partly on individual trust metrics for portions of the data that are aggregated to generate the aggregate data; and
    incorporating the aggregate trust metric into the aggregate data tracking information associated with the aggregate data.

4. The method of claim 1, further comprising:
    receiving one or more restrictions on use of the data, the one or more restrictions provided by the at least one end-user;
    monitoring the use of the data to determine a degree of compliance, by the data consumer, with the one or more restrictions; and
    updating the data consumer trust metric based on the determined degree of compliance.

5. The method of claim 1, wherein the data consumer trust metric is further based at least partly on at least one trust rating provided by the at least one end-user.

6. The method of claim 1, wherein the plurality of individual platforms include at least two of:
    an e-commerce platform configured to provide an e-commerce service;
    a retail platform configured to support retail operations of a physical store;
    a media platform configured to provide an online media service;
    a mobile computing device;
    an Internet of Things (IoT) computing device; or
    an in-vehicle computer.

7. A system comprising:
    at least one processor; and
    a memory communicatively coupled to the at least one processor, the memory storing instructions which, when executed by the at least one processor, cause the at least one processor to perform operations comprising:
        storing, on one or more storage devices associated with a super-platform, data generated at a plurality of individual platforms, the data associated with at least one end-user of the plurality of individual platforms;
        determining data tracking information including one or more events associated with the data, the one or more events including a distribution of the data to a data consumer, the data tracking information including a blockchain associated with the data;
        based at least partly on the data tracking information, determining a data consumer trust metric that indicates a level of trust in the data consumer;
        determining a data provider trust metric that indicates a level of trust in one or more of an end-user and an individual platform that generated the data, the data provider trust metric based at least partly on at least one trust rating provided by at least one data consumer;
        incorporating the data provider trust metric into the data tracking information associated with the data;
        aggregating the data from multiple individual platforms to generate aggregate data;
        determining aggregate data tracking information including one or more events associated with the aggregate data; and
        presenting the data consumer trust metric to the at least one end-user.

8. The system of claim 1, wherein the data tracking information includes an event that indicates the aggregating of the data and that includes a pointer to the aggregate data tracking information associated with the aggregate data.

9. The system of claim 1, the operations further comprising:
 determining an aggregate trust metric for the aggregate data based at least partly on individual trust metrics for portions of the data that are aggregated to generate the aggregate data; and
 incorporating the aggregate trust metric into the aggregate data tracking information associated with the aggregate data.

10. One or more non-transitory computer-readable storage media storing instructions which, when executed by at least one processor, cause the at least one processor to perform operations comprising:
 storing, on one or more storage devices associated with a super-platform, data generated at a plurality of individual platforms, the data associated with at least one end-user of the plurality of individual platforms;
 determining data tracking information including one or more events associated with the data, the one or more events including a distribution of the data to a data consumer, the data tracking information including a blockchain associated with the data;
 based at least partly on the data tracking information, determining a data consumer trust metric that indicates a level of trust in the data consumer;
 determining a data provider trust metric that indicates a level of trust in one or more of an end-user and an individual platform that generated the data, the data provider trust metric based at least partly on at least one trust rating provided by at least one data consumer;
 incorporating the data provider trust metric into the data tracking information associated with the data;
 aggregating the data from multiple individual platforms to generate aggregate data;
 determining aggregate data tracking information including one or more events associated with the aggregate data; and
 presenting the data consumer trust metric to the at least one end-user.

11. The one or more computer-readable storage media of claim 10, the operations further comprising:
 receiving one or more restrictions on use of the data, the one or more restrictions provided by the at least one end-user;
 monitoring the use of the data to determine a degree of compliance, by the data consumer, with the one or more restrictions; and
 updating the data consumer trust metric based on the determined degree of compliance.

12. The one or more computer-readable storage media of claim 10, wherein the data consumer trust metric is further based at least partly on at least one trust rating provided by the at least one end-user.

13. The one or more computer-readable storage media of claim 10, wherein the plurality of individual platforms include at least two of:
 an e-commerce platform configured to provide an e-commerce service;
 a retail platform configured to support retail operations of a physical store;
 a media platform configured to provide an online media service;
 a mobile computing device;
 an Internet of Things (IoT) computing device; or
 an in-vehicle computer.

* * * * *

UNITED STATES PATENT AND TRADEMARK OFFICE
CERTIFICATE OF CORRECTION

PATENT NO. : 9,928,290 B2  
APPLICATION NO. : 15/095481  
DATED : March 27, 2018  
INVENTOR(S) : Steven C. Tiell Page 1 of 1

It is certified that error appears in the above-identified patent and that said Letters Patent is hereby corrected as shown below:

In the Claims

In Claim 8, Column 22, Line 66, delete "claim 1," and insert -- claim 7, --, therefor.

In Claim 9, Column 23, Line 3, delete "claim 1," and insert -- claim 7, --, therefor.

Signed and Sealed this  
Nineteenth Day of March, 2019

Andrei Iancu  
*Director of the United States Patent and Trademark Office*